(12) United States Patent
Wen et al.

(10) Patent No.: US 12,511,591 B1
(45) Date of Patent: Dec. 30, 2025

(54) METHOD AND DEVICE FOR SCHEDULE AN UNMANNED VEHICLE (71) Applicants: Gree Electric Appliances, Inc. of Zhuhai, Guangdong (CN); Zhuhai Leayun Technology Co., Ltd, Zhuhai (CN)

(72) Inventors: Shunhao Wen, Guangdong (CN); Yang Zhang, Guangdong (CN); Yaqi Ma, Guangdong (CN); Yanyu Chen, Guangdong (CN)

(73) Assignees: Gree Electric Appliances, Inc. of Zhuhai, Guangdong (CN); Zhuhai Leayun Technology Co., Ltd, Guangdong (CN)

( * ) Notice: Subject to any disclaimer, the term of this patent is extended or adjusted under 35 U.S.C. 154(b) by 301 days.

(21) Appl. No.: 18/021,745

(22) PCT Filed: Aug. 13, 2021

(86) PCT No.: PCT/CN2021/112569
§ 371 (c)(1),
(2) Date: Feb. 16, 2023

(87) PCT Pub. No.: WO2022/127150
PCT Pub. Date: Jun. 23, 2022

(30) Foreign Application Priority Data

Dec. 17, 2020 (CN) .......................... 202011497730.9

(51) Int. Cl.
G06Q 10/047 (2023.01)
(52) U.S. Cl.
CPC ................................ G06Q 10/047 (2013.01)

(58) Field of Classification Search
CPC ...................................................... G06Q 10/47
(Continued)

(56) References Cited

U.S. PATENT DOCUMENTS 9,195,938 B1 * 11/2015 Bonawitz .................. B64B 1/00
10,222,222 B2 * 3/2019 Stankoulov ....... B60W 40/1005
(Continued)

FOREIGN PATENT DOCUMENTS

| CN | 102610091 A | 7/2012 |
|---|---|---|
| CN | 105674994 A | 6/2016 |

(Continued)

OTHER PUBLICATIONS

International Search Report, with a mailing date of Oct. 20, 2021, in International application No. PCT/CN2021/112569, filed on Aug. 13, 2021 (4 pages).

(Continued)

*Primary Examiner* — Yazan A Soofi
(74) *Attorney, Agent, or Firm* — MCANDREWS HELD & MALLOY, LTD (57) ABSTRACT

The present invention provides a method and device for schedule an unmanned vehicle, which belongs to the technical field of intelligent scheduling. The method in the present application comprises: receiving a scheduling task, wherein the scheduling task comprises a starting point position and an ending point position; planning a target path according to a side weight of each of a plurality of road sections, wherein the target path comprises the plurality of road sections between the starting point position and the ending point position, and the cost value of each road section of the plurality of road sections is the minimum; and executing the scheduling task according to the target path.

15 Claims, 3 Drawing Sheets

(58) Field of Classification Search
USPC .......................................................... 701/533
See application file for complete search history.

(56) References Cited

U.S. PATENT DOCUMENTS

| | | | |
|---|---|---|---|
| 10,621,448 B2* | 4/2020 | Schubert | ................... B62D 1/28 |
| 2018/0240045 A1* | 8/2018 | Zhang | ................... G06Q 50/40 |
| 2020/0089239 A1* | 3/2020 | Navarro | ................. G06Q 50/40 |
| 2020/0284883 A1* | 9/2020 | Ferreira | ................ G01S 7/4815 |

FOREIGN PATENT DOCUMENTS

| | | |
|---|---|---|
| CN | 105716613 A | 6/2016 |
| CN | 108154254 A | 6/2018 |
| CN | 109669456 A | 4/2019 |
| CN | 111338343 A | 6/2020 |
| CN | 111721297 A | 9/2020 |
| CN | 112561168 A | 3/2021 |
| IN | 109471444 A | 3/2019 |

OTHER PUBLICATIONS

The first CN search report in CN application No. 2020114977309.
The second CN search report in CN application No. 2020114977309.
International Search Report, with a mailing date of Jan. 12, 2021, in International application No. PCT/US2020/048789, filed on Aug. 31, 2020 (28 pages).
Chen Yi and Wang Jing, An improved weighted A* algorithm for a road network with traffic restrictions and its implementation based on a database, Journal of Beijing University of Chemical Technology (Natural Science), vol. 36, No. 5, May 25, 2009 (5 pages).

* cited by examiner

Original A-star planning    Improved A-star planning

Fig. 4

METHOD AND DEVICE FOR SCHEDULE AN UNMANNED VEHICLE

This application is a 371 of International Patent Application No. PCT/CN2021/112569, filed Aug. 13, 2021, which claims benefit of Chinese Patent Application No. 202011497730.9, filed to the China National Intellectual Property Administration on Dec. 17, 2020, entitled "Dispatching Method and Apparatus for Automated Guided Vehicle," contents of both of which are hereby incorporated by reference in their entireties.

TECHNICAL FIELD

The present disclosure belongs to the technical field of intelligent scheduling, and specifically relates to a method and device for schedule an unmanned vehicle, a computer device and a computer readable storage medium.

BACKGROUND

An unmanned vehicle is referred to as an AGV vehicle, and the vehicle body is equipped with an automatic guiding device to guide the AGV vehicle to move along a planned path. It can complete a series of tasks such as goods delivery and automatic charging, has the advantages of high efficiency and good safety, and plays a positive role in promoting industrial automation.

The AGV vehicle body is equipped with an on-board control system, which can establish communication with a scheduling system through a wireless LAN. The scheduling system dispatches tasks. The AGV vehicle plans a route and executes a task according to the created task. Wherein, the path planning refers to a strategy which is configured to constitute a sequence of points or a curve connecting a starting point position and an ending point position. An A-star algorithm is one of heuristic search algorithms in the path planning.

The original A-star algorithm obtains the shortest path by calculation according to task information and arranges an AGV vehicle to perform the task. However, the original A-star algorithm only considers the distance, and does not consider irresistible external factors such as a narrow road, a single lane road prone to traffic conflicts, a cross road and a crowded pedestrian area. Therefore, the planned shortest path is not the optimal path. Inevitably, there is a certain probability that the optimal vehicle and the optimal path cannot be obtained.

With the above disclosure solution, the original A-star algorithm only considers the distance and the shortest path planned is not the optimal path, thus reducing the transportation efficiency.

SUMMARY

An aspect of embodiments of the disclosure provides a method for schedule an unmanned vehicle, wherein the method includes:
a scheduling task is received, wherein the scheduling task includes a starting point position and an ending point position;
a target path according to the side weight of each of a plurality of road sections is planned, wherein the target path includes the plurality of road sections between the starting point position and the ending point position, and the cost value of each road section of the plurality of road sections is the minimum; and
the scheduling task according to the target path is executed.

In some embodiments, the step of a target path according to the side weight of each of the plurality of road sections is planned includes:
repeat the following steps began from the starting point position until a position next to the current position reaches the ending point position:
reachable positions of the current position are obtained, wherein the reachable positions do not include the previous position of the current position;
cost values from the current position to the each of the reachable positions respectively are calculated; and
a reachable position with the smallest cost value as the position next to the current position is determined.

In some embodiments, cost values from the current position to the each of the reachable positions are calculated according to the following formula:

$$F(n)=(G(n)+H(n))\times i$$

wherein $G(n)$ represents moving cost values from the current position to the each of the reachable positions; $H(n)$ represents predictive cost values from the reachable positions to the ending point position; i represents the side weights of the road sections between the current position and the reachable positions; $F(n)$ represents the cost values from the current position to the each of the reachable positions.

In some embodiments, before a scheduling task is received, the method includes:
an unmanned vehicle closest to the starting point position from unmanned vehicles in an idle state is selected, and the scheduling task to the unmanned vehicle is sent.

In some embodiments, before a scheduling task is received, the method includes:
the side weight for each of the plurality of road sections between the starting point position and the ending point position is pre-set.

A second aspect of embodiments of the disclosure provide a device for schedule an unmanned vehicle, wherein the device includes:
a reception component, configured to receiving a scheduling task, wherein the scheduling task includes a starting point position and an ending point position;
a planning component, configured to plan a target path according to the side weight of each of a plurality of road sections, wherein the target path includes the plurality of road sections between the starting point position and the ending point position, and the cost value of each road section of the plurality of road sections is the minimum; and
an execution component, configured to execute the scheduling task according to the target path.

In some embodiments, the planning component, configured to:
begin from the starting point position to repeat the following steps until a position next to the current position reaches the ending point position:
obtain reachable positions of the current position, wherein the reachable positions do not include the previous position of the current position;
calculate cost values from the current position to the each of the reachable positions respectively; and
determine a reachable position with the smallest cost value as the position next to the current position.

In some embodiments, cost values from the current position to the each of the reachable positions are calculated according to the following formula:

$$F(n)=(G(n)+H(n))\times i$$

wherein G(n) represents moving cost values from the current position to the each of the reachable positions; H(n) represents predictive cost values from the reachable positions to the ending point position; i represents the side weights of the road sections between the current position and the reachable positions; F(n) represents the cost values from the current position to the each of the reachable positions.

A third aspect of embodiments of the disclosure provides a computer device, includes a memory, a processor, and a computer program stored on the memory and capable of running on the processor, wherein the processor executes the computer program so as to implement the method for schedule an unmanned vehicle as described in the first aspect.

A fourth aspect of embodiments of the disclosure provides a computer readable storage medium on which a computer program is stored, wherein the processor executes the computer program so as to implement the method for schedule an unmanned vehicle as described in the first aspect.

The present disclosure employs the above technical solutions, which have at least the following beneficial effects:

The method in the present disclosure includes: a scheduling task is received, wherein the scheduling task includes a starting point position and an ending point position; a target path according to the side weight of each of a plurality of road sections is planned, wherein the target path includes the plurality of road sections between the starting point position and the ending point position, and the cost value of each road section of the plurality of road sections is the minimum; and the scheduling task according to the target path is executed.

It should be understood that the general description above and the detailed description below are only illustrative and explanatory and do not limit the present disclosure.

BRIEF DESCRIPTION OF THE DRAWINGS

In order to more clearly illustrate the technical solutions in embodiments of the present disclosure or in prior art, a brief introduction of the drawings required to be used in the description of the embodiments or prior art is presented below. It is obvious that the drawings described below are only some embodiments of the present disclosure. For a person skilled in the art, without any creative effort, additional drawings can also be obtained from these drawings.

DETAILED DESCRIPTION OF THE EMBODIMENTS

In order to make the purposes, technical solutions and advantages of the present disclosure more clear, the technical solutions of the present disclosure will be described in detail below. Obviously, the embodiments described are only a part of the embodiments of the present disclosure and not all the embodiments. On the basis of the embodiments in the present disclosure, all other embodiments obtained by a person skilled in the art without creative effort are within the protection scope of the present disclosure.

Figure 1:
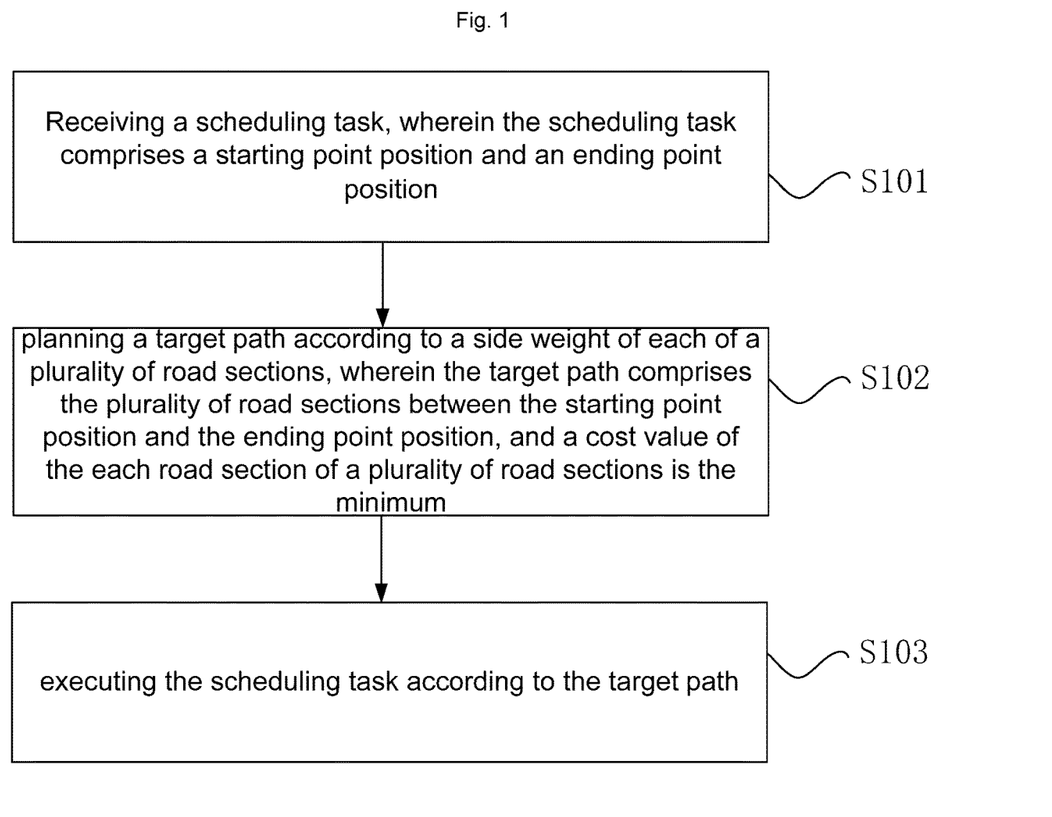
FIG. 1 is a flow chart of a method for schedule an unmanned vehicle according to an exemplary embodiment.

FIG. 1 is a flow chart of a method for schedule an unmanned vehicle according to an exemplary embodiment. As shown in FIG. 1, the method includes the following steps:

Step S101, a scheduling task is received, wherein the scheduling task includes a starting point position and an ending point position.

In one embodiment, when received a scheduling request, a scheduling system generates the scheduling task, wherein the scheduling request carries the starting point position and the ending point position. After the scheduling system generates the scheduling task, the scheduling system would select an unmanned vehicle closest to the starting point position from unmanned vehicles in an idle state, and send the scheduling task to the unmanned vehicle.

In one embodiment, the method includes, before the unmanned vehicle receives the scheduling task dispatched by the scheduling system, the scheduling system pre-sets the side weight for each of the plurality of road sections between the starting point position and the ending point position.

Optionally, for some special paths and road sections with extra costs, the most suitable value of the side weight is i=1.5; and for normal paths and road sections, the most suitable value of the side weight is i=1.

In one embodiment, the scheduling system would send the side weight of each of a plurality of road sections to the unmanned vehicle when dispatching the scheduling task.

Step S102, a target path according to the side weight of each of a plurality of road sections is planned, wherein the target path includes the plurality of road sections between the starting point position and the ending point position, and the cost value of each road section of the plurality of road sections is the minimum.

In an embodiment, the step of planning, by the unmanned vehicle, a target path according to the side weight of each of the plurality of road sections includes:

the following steps begin from the starting point position until a position next to the current position reaches the ending point position is repeated:

reachable positions of the current position are obtained, wherein the reachable positions do not include the previous position of the current position;

cost values from the current position to the each of the reachable positions respectively are calculated; and a reachable position with the smallest cost value as the position next to the current position is determined.

In some embodiments, cost values from the current position to the each of the reachable positions are calculated according to the following formula:

$$F(n)=(G(n)+H(n))\times i$$

wherein G(n) represents moving cost values from the current position to the each of the reachable positions; H(n) represents predictive cost values from the reachable positions to the ending point position; i represents the side weights of the road sections between the current position and the reachable positions; F(n) represents the cost values from the current position to the each of the reachable positions.

By considering the edge weight of each road section, the target path determined is the optimal path with the minimum cost value, and the transportation efficiency of the unmanned vehicle can be greatly improved by the scheduling task according to the target path is executed.

Step S103, the scheduling task according to the target path is executed.

After determined the optimal target path according to the side weight of each of a plurality of road sections, the unmanned vehicle automatically executes the scheduling task according to the planned target path, and after the completion of the scheduling task, it feeds back a notification message to the scheduling system to inform the scheduling system of the completion of the scheduling task.

In summary, the method in the present disclosure includes: a scheduling task is received dispatched by a scheduling system, by an unmanned vehicle, wherein the scheduling task includes a starting point position and an ending point position; planning, by the unmanned vehicle, a target path according to the side weight of each of a plurality of road sections, wherein the target path includes the plurality of road sections between the starting point position and the ending point position, and the cost value of each road section of the plurality of road sections is the minimum; and executing, by the unmanned vehicle, the scheduling task according to the target path. Compared with the existing technology which only considers the shortest path determined by the distance, the present disclosure can accurately determine the optimal path in the intelligent scheduling of the unmanned vehicle, thus solving the problem in the related art that the shortest path planned by the original A-star algorithm which only considers the distance is not the optimal path so that the transportation efficiency is reduced, and can achieve the technical effect of improving the transportation efficiency.

The embodiments of the present disclosure are described and illustrated by preferred embodiments below.

Figure 2:
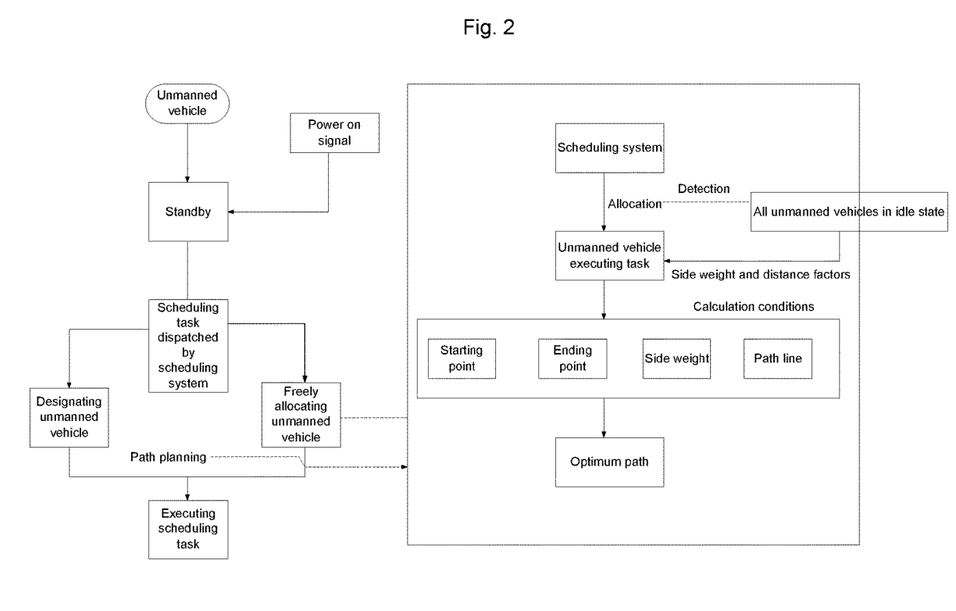
FIG. 2 is a schematic diagram of a scheduling process of an unmanned vehicle according to an exemplary embodiment.

FIG. 2 is a schematic diagram of a scheduling process of an unmanned vehicle according to an exemplary embodiment. As shown in FIG. 2, the scheduling process can be described as follows:

An unmanned vehicle system is in a standby mode. After received a power on signal, it receives a scheduling task dispatched by the scheduling system. The scheduling system can specify an unmanned vehicle or freely allocate an unmanned vehicle, and then the unmanned vehicle carries out path planning and executes the scheduling task according to the planned path. Wherein, the dispatching system can detect all unmanned vehicles in an idle state, and determine the unmanned vehicle to perform the task based on the side weights of road sections and a distance factor, and then the unmanned vehicle plans the optimal path according to a starting point, an ending point, side weights and a path line.

In this embodiment, an AGV scheduling method based on an A-star algorithm considering weights is proposed, wherein the AGV is the unmanned vehicle. The improved A-star algorithm considering a weight factor is applied to find the optimal vehicle and carry out a task path planning when creating a task to automatically allocate the vehicle. Considering the weight factor is namely to assign a specified weight according to a condition of each road section. Considering an extra overhead cost brought by each section in an actual road section condition, and carrying out the path planning with the goal of optimal time and path. With the improved A-star algorithm considering the calculation of the side weights, planning the optimal path according to the product of the sum of a moving cost value and an estimated value of the A-star algorithm and the weight i.

A specific implementation method of this embodiment is as follows:

(1) Specifying the side weight of each path: a map route and an actual route are not completely consistent, and the actual scene of an experiment has certain external factors affecting the actual effect, such as a single lane, an intersection. Usually, the cost of such side weight factor is a little higher. In this embodiment, it is proposed that the weight i is dynamically assigned to the path and road section. Considering the influence of value size of the weight setting on the road section, a large number of experiments are conducted through a data comparison method, and data analysis is conducted according to a clustering algorithm. When the side weight is set too large, it would cause that each planning of the A-star algorithm not to pass through this road section, that is, the road section becomes meaningless. When the side weight is set too small, there is a certain probability that the planned path is not the optimal path. The optimal value of the side weight setting can be obtained from the analysis of the experimental data. The most suitable value of the side weight is set as i=1.5 for some special paths and road sections that would cause extra costs. The most suitable value of the side weight is set as i=1 for normal paths and road sections. The value of i is the cost value of the path, that is, the side weight. It is used as the basis for calculation.

According to the analysis results of the above data comparison experiment, the scheduling system would set i=1 by default for a normal path; and for some special paths such as intersections and single lanes, the side weight that the operator needs to edit in the scheduling system is set as i=1.5.

(2) Adding the side weight i when the A-star algorithm calculates the shortest path, wherein the evaluation function of the original A-star algorithm is:

$$F(n)=G(n)+H(n)$$

The process of the algorithm is to evaluate nodes in all directions from a starting point, and take, according to the evaluation cost values, the node with the smallest cost, that is, the shortest path, as a point passed through by the AGV vehicle until it reaches the ending point. However, the original A-star algorithm only considers the distance and does not consider other factors, leading to a certain error in the actual planned path. Therefore, the shortest path is not the optimal path.

In this preferred embodiment, it is proposed to increase the side weight i when calculated with the A-star algorithm, and the new formula of the improved algorithm is as follows:

$$F(n)=(G(n)+H(n))\times i$$

The side weight i is set by the user according to a field situation. G(n) is a moving cost from a starting point to the current point, and H(n) is an estimated value from the starting point to a target point. The product of the sum of the two after calculation and i is the result of the evaluation function F(n). The smaller the value, the lower the cost caused by the path, so as to obtain the optimal path.

Figure 3:
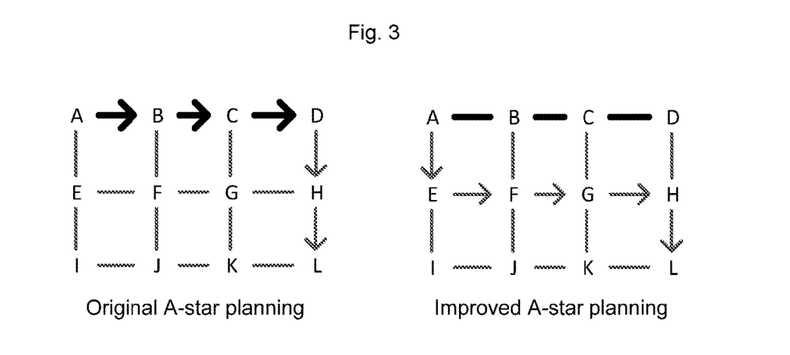
FIG. 3 is a schematic diagram of an optimal path comparison according to an exemplary embodiment.

(3) As shown in FIG. 3, thickened line segments AB, BC and CD are specified special road sections. After calculation by the original A-star algorithm, the shortest path passing through the special road sections as shown on the left of the figure is obtained, namely (AB, BC, CD, DH, HL). Although the planned route is the shortest path, during the actual operation of the AGV vehicle, it takes a long time to pass through the special road sections, and the cost is increased. The improved A-star algorithm takes the side weight into account and plans the optimal route (AE, EF, FG, GH, HL) in case of avoiding the special road sections as much as possible, as shown in the figure on the right. In comparison, the transportation time is greatly shortened.

Through the above experiments, compared with the shortest route planning of the original A-star algorithm, the AGV method for schedule for the optimal route planning can reduce the cost value and plan the optimal path based on the field road section conditions.

The disclosure object of this embodiment is not limited to the AGV vehicle, but also can be similar transportation scheduling tools, such as AGV warehouse forklift.

The embodiment solves the following problems:
1. Planning the optimal path to improve the transportation efficiency. Aiming at the problem of the shortest distance calculated by the original A-star algorithm only considering the distance size and the problem that the AGV vehicle greatly increases the transportation time caused by some external factors such as a single lane road prone to traffic conflicts, a cross road and a crowded pedestrian area, the method of considering the side weight factor is employed to plan the optimal path so as to improve the transportation efficiency.
2. Enhancing security. In view of the problem that accidents are likely to occur in some densely populated areas, weights are assigned to this type of road sections to avoid passing through this type of road sections as much as possible, so as to improve the security. When the route is required by the task, this type of road sections can still be passed through without causing a waste of road section resources.

The beneficial effects of this embodiment that can be realized are as follows: the improved A-star algorithm can also correctly plan the optimal path for the irresistible external factors such as a narrow road, a single lane road prone to traffic conflicts, a cross road and a crowded pedestrian area, and obtain the optimal vehicle and path, thus greatly enhancing the stability and safety, and greatly improving the transportation efficiency.

The present embodiment also provides a scheduling device an unmanned vehicle, which is used to realize the above embodiments and the preferred implementations. The contents that have already been explained would not be repeated herein. As used below, the terms "module", "component", "sub-component" and so on mean a combination of software and/or hardware that can perform a predetermined function. Although the device described in the following embodiments is preferably implemented in software, implementation of hardware, or a combination of software and hardware is also possible and conceived.

Figure 4:
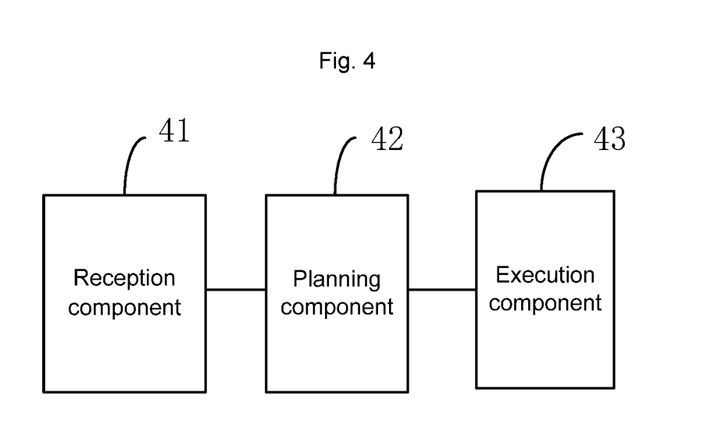
FIG. 4 is a schematic diagram of a device for schedule an unmanned vehicle according to an exemplary embodiment.

FIG. 4 is a schematic diagram of a scheduling device an unmanned vehicle according to an exemplary embodiment. As shown in FIG. 4, the device includes:
a reception component 41, configured to receive a scheduling task, wherein the scheduling task includes a starting point position and an ending point position;
a planning component 42, configured to plan a target path according to the side weight of each of a plurality of road sections, wherein the target path includes the plurality of road sections between the starting point position and the ending point position, and the cost value of each road section of the plurality of road sections is the minimum; and
an execution component 43, configured to execute the scheduling task according to the target path.

In an embodiment, the planning component 42 is configured to:
begin from the starting point position to repeat the following steps until a position next to the current position reaches the ending point position:
obtain reachable positions of the current position, wherein the reachable positions do not include the previous position of the current position;
calculate cost values from the current position to the each of the reachable positions respectively; and
determine a reachable position with the smallest cost value as the position next to the current position.

In an embodiment, calculate cost values from the current position to the each of the reachable positions according to the following formula:

$$F(n)=(G(n)+H(n))\times i$$

wherein G(n) represents moving cost values from the current position to the each of the reachable positions; H(n) represents predictive cost values from the reachable positions to the ending point position; i represents the side weights of the road sections between the current position and the reachable positions; F(n) represents the cost values from the current position to the each of the reachable positions.

In an embodiment, the device includes:
a selection component, configured to select, before received the scheduling task, an unmanned vehicle closest to the starting point position from unmanned vehicles in an idle state, and send the scheduling task to the unmanned vehicle.

In an embodiment, the device includes:
a pre-setting component, configured to pre-set the side weight for each of the plurality of road sections between the starting point position and the ending point position before received the scheduling task.

It should be noted that the above modules can be functional modules or program modules, each of which can be realized by software or hardware. For modules implemented through the hardware, the above modules can be located in the same processor; or the modules can be located in different processors in any combination.

The embodiment of the present disclosure also provides a computer device, and the method for schedule an unmanned vehicle in the embodiment of the present disclosure can be realized by the computer device. The computer device in the embodiment of the present disclosure includes a memory, a processor, and a computer program stored on the memory and capable of running on the processor, wherein the processor executes the computer program so as to implement the method for schedule an unmanned vehicle as described in any one of the above embodiments.

The embodiment of the present disclosure also provides a computer readable storage medium. A computer program is stored on the computer readable storage medium; and the processor executes the computer program so as to implement the method for schedule an unmanned vehicle as described in any one of the above embodiments.

It is understood that the same or similar parts of the above embodiments may be referred to each other, and the contents not specifically described in some embodiments may be referred to the same or similar contents in other embodiments.

It should be noted that in the description of the present disclosure, the terms "first", "second" and so on are used for descriptive purposes only and are not to be construed as indicating or suggesting relative importance. In addition, in the description of the present disclosure, the meaning of "a plurality of" and "multiple" means at least two unless otherwise stated.

It should be understood that when a component is said to be "fixed on" or "set on" another component, it may be directly on the other component or there may be an intermediate component. When a component is said to be "connected" to another component, it may be directly connected to said another component or there may be an intermediate component. Furthermore, the "connection" used herein may include a wireless connection. The wording "and/or" used includes any component and all combinations of one or more associated listed items.

Any process or method description described in the flowchart or in other forms herein may be understood as: representing a module, fragment or part of codes include one or more executable instructions for implementing the steps of a particular logical function or process, and the scope of the preferred implementations of the present disclosure includes additional implementations which may not be in the order indicated or discussed, includes the execution of the functions in a substantially simultaneous manner or in reverse order according to the functions involved. This should be understood by a person skilled in the art to which the embodiments of the present disclosure belongs.

It should be understood that parts of the present disclosure may be implemented with hardware, software, firmware or a combination thereof. In the above implementations, a plurality of steps or methods can be implemented with software or firmware stored in a memory and executed by a suitable instruction execution system. For example, if implemented in hardware, as in another implementation, any of the following technologies known in the art or a combination thereof may be used: a discrete logic circuit with a logic gate circuit for a logic function of a data signal, an disclosure specific integrated circuit with an appropriate combined logic gate circuit, a programmable gate array (PGA), a field programmable gate array (FPGA), etc.

A person skilled in the art can understand that all or part of the steps included in the methods of the above embodiments can be realized by employing the program to instruct the related hardware, and the program can be stored in a computer readable storage medium, which, when executed, includes one of the steps of the method embodiments or a combination thereof.

In addition, each functional component in each embodiment of the present disclosure can be integrated in a processing module, or each component can exist separately and physically, or two or more components can be integrated in a module. The above integrated module can be realized in the form of hardware or software function module. The integrated module can also be stored in a computer readable storage medium if it is realized in the form of a software functional module and sold or used as an independent product.

The storage medium mentioned above can be a read-only memory, a disk, an optical disc and so on.

In the description of this specification, the description of reference terms such as "an embodiment", "some embodiments", "an example", "specific examples", or "some examples" means the specific feature, structure, material or characteristic described in combination with the embodiment or example is contained in at least one embodiment or example of the present disclosure. In this specification, schematic representations of the above terms do not necessarily refer to identical embodiments or examples. Furthermore, the specific features, structures, materials or characteristics described may be combined in an appropriate manner in any one or more embodiments or examples.

Although embodiments of the present disclosure have been shown and described above, it is understood that the above embodiments are exemplary and cannot be construed as a limitation to the present disclosure, and that the above embodiments may be modified, changed, replaced and altered by a person skilled in the art within the scope of the present disclosure.

What is claimed is:

1. A method for schedule an unmanned vehicle, wherein the method comprises:
   receiving a scheduling task, wherein the scheduling task comprises a starting point position and an ending point position;
   planning a target path according to a side weight of each of a plurality of road sections, wherein the target path comprises the plurality of road sections between the starting point position and the ending point position, and a cost value of the each road section of a plurality of road sections is the minimum; and
   executing the scheduling task according to the target path;
   wherein calculating the cost values from the current position to the each of the reachable positions according to the following formula:

$$F(n)=(G(n)+H(n))\times i$$

wherein G(n) represents moving the cost values from the current position to the each of the reachable positions; H(n) represents predictive the cost values from the reachable positions to the ending point position; i represents the side weights of the road sections between the current position and the reachable positions; F(n) represents the cost values from the current position to the each of the reachable positions;
   for special road sections, i=1.5, wherein the special road sections comprises one-way road, intersections, or pedestrian-dense areas:
   for normal road sections, i=1.

2. The method according to claim 1, wherein before receiving the scheduling task, the method further comprises:
   selecting an unmanned vehicle closest to the starting point position from unmanned vehicles in an idle state, and sending the scheduling task to the unmanned vehicle.

3. The method according to claim 1, wherein before receiving the scheduling task, the method further comprises:
   pre-setting the side weight for each of the plurality of road sections between the starting point position and the ending point position.

4. A computer device, comprising a memory, a processor, and a computer program stored on the memory and capable of running on the processor, wherein the processor executes the computer program so as to implement the method for schedule an unmanned vehicle, wherein the method comprises:
   receiving a scheduling task, wherein the scheduling task comprises a starting point position and an ending point position;
   planning a target path according to a side weight of each of a plurality of road sections, wherein the target path comprises the plurality of road sections between the starting point position and the ending point position, and a cost value of the each road section of a plurality of road sections is the minimum; and
   executing the scheduling task according to the target path.

5. A computer readable storage medium on which a computer program is stored, wherein the processor executes the method for schedule an unmanned vehicle, wherein the method comprises:
   receiving a scheduling task, wherein the scheduling task comprises a starting point position and an ending point position;
   planning a target path according to a side weight of each of a plurality of road sections, wherein the target path comprises a plurality of road sections between the starting point position and the ending point position, and a cost value of the each of the plurality of road sections is the minimum; and
   executing the scheduling task according to the target path.

6. The method according to claim 1, wherein before receiving the scheduling task, the method further comprises:
   selecting an unmanned vehicle closest to the starting point position from unmanned vehicles in an idle state, and sending the scheduling task to the unmanned vehicle.

7. The method according to claim 1, wherein before receiving the scheduling task, the method further comprises:
   selecting an unmanned vehicle closest to the starting point position from unmanned vehicles in an idle state, and sending the scheduling task to the unmanned vehicle.

8. The method according to claim 1, wherein before receiving the scheduling task, the method further comprises:
   pre-setting the side weight for each of the plurality of road sections between the starting point position and the ending point position.

9. The method according to claim 1, wherein before receiving the scheduling task, the method further comprises:
   pre-setting the side weight for each of the plurality of road sections between the starting point position and the ending point position.

10. The computer device according to claim 4, wherein planning the target path according to the side weight of the each road section comprises:
    beginning from the starting point position to repeat following steps until a position next to the current position reaches the ending point position:
    obtaining reachable positions of the current position, wherein the reachable positions do not comprise a previous position of the current position;
    calculating cost values from the current position to each of the reachable positions respectively; and
    determining a reachable position with a smallest cost value as a position next to the current position.

11. The computer device according to claim 10, wherein calculating the cost values from the current position to the each of the reachable positions according to the following formula:

$$F(n) = (G(n) + H(n)) \times i$$

wherein G(n) represents moving the cost values from the current position to the each of the reachable positions; H(n) represents predictive the cost values from the reachable positions to the ending point position; i represents the side weights of the road sections between the current position and the reachable positions; F(n) represents the cost values from the current position to the each of the reachable positions.

12. The computer device according to claim 4, comprising a memory, wherein before receiving the scheduling task, the method further comprises:
    selecting an unmanned vehicle closest to the starting point position from unmanned vehicles in an idle state, and sending the scheduling task to the unmanned vehicle.

13. The computer readable storage medium on which a computer program is stored according to claim 5, wherein planning the target path according to the side weight of the each road section comprises:
    beginning from the starting point position to repeat following steps until a position next to the current position reaches the ending point position:
    obtaining reachable positions of the current position, wherein the reachable positions do not comprise a previous position of the current position;
    calculating cost values from the current position to each of the reachable positions respectively; and
    determining a reachable position with a smallest cost value as a position next to the current position.

14. The computer readable storage medium on which a computer program is stored according to claim 5, wherein calculating the cost values from the current position to the each of the reachable positions according to the following formula: $F(n) = (G(n) + H(n)) \times i$ wherein G(n) represents moving the cost values from the current position to the each of the reachable positions; H(n) represents predictive the cost values from the reachable positions to the ending point position; i represents the side weights of the road sections between the current position and the reachable positions; F(n) represents the cost values from the current position to the each of the reachable positions.

15. The computer readable storage medium on which a computer program is stored according to claim 5, wherein before receiving the scheduling task, the method further comprises:
    selecting an unmanned vehicle closest to the starting point position from unmanned vehicles in an idle state, and sending the scheduling task to the unmanned vehicle.

* * * * *